United States Patent
Hiramatsu (10) Patent No.: US 7,909,724 B2
(45) Date of Patent: Mar. 22, 2011

(54) AUTOMATIC TRANSMISSION

(75) Inventor: Takeo Hiramatsu, Nagaokakyo (JP)

(73) Assignee: Jatco Ltd, Fuji-shi (JP)

( * ) Notice: Subject to any disclaimer, the term of this patent is extended or adjusted under 35 U.S.C. 154(b) by 0 days.

(21) Appl. No.: 12/902,585

(22) Filed: Oct. 12, 2010

(65) Prior Publication Data

US 2011/0028263 A1 Feb. 3, 2011

Related U.S. Application Data (62) Division of application No. 12/122,927, filed on May 19, 2008, now Pat. No. 7,833,123.

(30) Foreign Application Priority Data

May 31, 2007 (JP) .................................. 2007-144323

(51) Int. Cl.
*F16H 3/62* (2006.01)
(52) U.S. Cl. ........................................................ 475/276
(58) Field of Classification Search .................... None
See application file for complete search history.

(56) References Cited

U.S. PATENT DOCUMENTS

| | | | |
|---|---|---|---|
| 6,648,791 B2 | 11/2003 | Kao et al. | |
| 7,044,881 B2 | 5/2006 | Tabata et al. | |
| 7,186,202 B2 | 3/2007 | Gumpoltsberger | |
| 7,201,698 B2 | 4/2007 | Gumpoltsberger | |
| 7,211,021 B2 | 5/2007 | Gumpoltsberger | |
| 7,211,022 B2 | 5/2007 | Tiesler et al. | |
| 7,294,088 B2 | 11/2007 | Shim et al. | |
| 7,632,206 B2 * | 12/2009 | Gumpoltsberger | 475/275 |
| 7,637,838 B2 * | 12/2009 | Gumpoltsberger | 475/275 |
| 7,731,622 B2 * | 6/2010 | Wittkopp et al. | 475/275 |
| 7,736,258 B2 * | 6/2010 | Wittkopp et al. | 475/275 |
| 7,749,127 B2 * | 7/2010 | Hart et al. | 475/276 |
| 2003/0060323 A1 | 3/2003 | Kao et al. | |
| 2005/0239593 A1 | 10/2005 | Gumpoltsberger | |
| 2006/0068965 A1 | 3/2006 | Gumpoltsberger | |

FOREIGN PATENT DOCUMENTS

| | | |
|---|---|---|
| DE | 10 2004 023 947 A1 | 12/2005 |
| EP | 1 398 532 A2 | 3/2004 |
| JP | 2004-176765 A | 6/2004 |
| WO | WO 2004/007994 A1 | 1/2004 |
| WO | WO 2004/007996 A1 | 1/2004 |

* cited by examiner

*Primary Examiner* — Dirk Wright (74) *Attorney, Agent, or Firm* — Foley & Lardner LLP

(57) ABSTRACT

An automatic transmission includes a first planetary gear set; a second planetary gear set; a third planetary gear set; and at least five friction elements. The at least five friction elements includes a first clutch adapted to selectively connect a first carrier with a second carrier; a first brake adapted to selectively stop a rotation of the second carrier; a second brake adapted to selectively stop a rotation of a rotating member having a first sun gear, a second ring gear, and a third carrier; a third brake adapted to selectively stop a rotation of a third sun gear; and a second clutch adapted to selectively connect the first carrier with a second sun gear. Each of at least seven forward speed-ratios and one reverse speed-ratio is achieved by engaging two friction elements selected from the first and second clutches and the first to third brakes.

3 Claims, 7 Drawing Sheets

$\rho_1 = Z_{S1}/Z_{R1} = 0.65$  $\rho_2 = Z_{S2}/Z_{R2} = 0.4$  $\rho_3 = Z_{S3}/Z_{R3} = 0.3$

| GEAR | A | B | C | D | E | FORMULA OF REDUCTION GEAR RATIO $i = n_T/n_2$ | REDUCTION GEAR RATIO | 1/REDUCTION GEAR RATIO |
|---|---|---|---|---|---|---|---|---|
| FIRST SPEED | ○ | ○ | | | | $i_1 = 1/(\rho_1 \rho_2)$ | 3.846 | 0.260 |
| SECOND SPEED | ○ | | ○ | | | $i_2 = (1+\rho_2)/(\rho_2(1+\rho_1))$ | 2.121 | 0.471 |
| THIRD SPEED | ○ | | | ○ | | $i_3 = (\rho_2(1+\rho_1+\rho_3)+\rho_3)/(\rho_2(1+\rho_1)(1+\rho_3))$ | 1.259 | 0.794 |
| FOURTH SPEED | ○ | | | | ○ | $i_4 = 1$ | 1.000 | 1.000 |
| FIFTH SPEED | | | | ○ | ○ | $i_5 = (1+\rho_1+\rho_3)/((1+\rho_1)(1+\rho_3))$ | 0.909 | 1.100 |
| SIXTH SPEED | | | ○ | | ○ | $i_6 = 1/(1+\rho_1)$ | 0.606 | 1.650 |
| SEVENTH SPEED | | ○ | | | ○ | $i_7 = 1/(1+\rho_1+\rho_1\rho_2)$ | 0.524 | 1.908 |
| REVERSE | | ○ | | ○ | | $i_R = -1/(\rho_2(1+\rho_3))$ | -1.923 | -0.520 |

RATIO COVERAGE: 7.34

$\rho_1 = Z_{S1}/Z_{R1} = 0.6$   $\rho_2 = Z_{S2}/Z_{R2} = 0.4$   $\rho_3 = Z_{S3}/Z_{R3} = 0.3$

| GEAR | A | B | C | D | E | FORMULA OF REDUCTION GEAR RATIO $i = n_T/n_2$ | REDUCTION GEAR RATIO | 1/REDUCTION GEAR RATIO |
|---|---|---|---|---|---|---|---|---|
| FIRST SPEED | ○ | ○ | | | | $i_1 = 1/(\rho_1\rho_2)$ | 4.167 | 0.240 |
| SECOND SPEED | ○ | | ○ | | | $i_2 = (1+\rho_2)/(\rho_2(1+\rho_1))$ | 2.188 | 0.457 |
| THIRD SPEED | ○ | | | ○ | | $i_3 = (\rho_2(1+\rho_1+\rho_3)+\rho_3)/(\rho_2(1+\rho_1)(1+\rho_3))$ | 1.274 | 0.785 |
| FOURTH SPEED | ○ | | | | ○ | $i_4 = 1$ | 1.000 | 1.000 |
| FIFTH SPEED | | | | ○ | ○ | $i_5 = (1+\rho_1+\rho_3)/((1+\rho_1)(1+\rho_3))$ | 0.913 | 1.095 |
| SIXTH SPEED | | | ○ | | ○ | $i_6 = 1/(1+\rho_1)$ | 0.625 | 1.600 |
| SEVENTH SPEED | | ○ | | | ○ | $i_7 = 1/(1+\rho_1+\rho_1\rho_2)$ | 0.543 | 1.842 |
| REVERSE | | ○ | | ○ | | $i_R = -1/(\rho_2(1+\rho_3))$ | -1.923 | -0.520 |

RATIO COVERAGE: 7.67

$\rho_1 = Z_{S1}/Z_{R1} = 0.4$  $\rho_2 = Z_{S2}/Z_{R2} = 0.65$  $\rho_3 = Z_{S3}/Z_{R3} = 0.55$

| GEAR | A | B | C | D | E | FORMULA OF REDUCTION GEAR RATIO $i = n_T/n_2$ | REDUCTION GEAR RATIO | 1/REDUCTION GEAR RATIO |
|---|---|---|---|---|---|---|---|---|
| FIRST SPEED | ○ | ○ | | | | $i_1 = (1+\rho_1)/(\rho_2 \rho_3)$ | 3.916 | 0.255 |
| SECOND SPEED | ○ | | ○ | | | $i_2 = (1+\rho_1)(1+\rho_2)/(\rho_2(1+\rho_3))$ | 2.293 | 0.436 |
| THIRD SPEED | ○ | | | ○ | | $i_3 = 1+\rho_1$ | 1.400 | 0.714 |
| FOURTH SPEED | ○ | | | | ○ | $i_4 = (1+\rho_1)/((1+\rho_1)(1-\rho_2\rho_3)+\rho_2\rho_3)$ | 1.114 | 0.898 |
| FIFTH SPEED | | | | ○ | ○ | $i_5 = 1$ | 1.000 | 1.000 |
| SIXTH SPEED | | | ○ | | ○ | $i_6 = 1/(1+\rho_3)$ | 0.645 | 1.550 |
| SEVENTH SPEED | | ○ | | | ○ | $i_7 = (1+\rho_1)/((1+\rho_1)(1+\rho_3)+\rho_2\rho_3)$ | 0.554 | 1.805 |
| REVERSE | | ○ | | ○ | | $i_R = -(1+\rho_3)/\rho_2$ | −2.154 | −0.464 |

RATIO COVERAGE: 7.07

FIG.9

AUTOMATIC TRANSMISSION

CROSS-REFERENCE TO RELATED APPLICATIONS

This application is a Divisional of U.S. application Ser. No. 12/122,927, filed May 19, 2008, which is based upon and claims the benefit of priority from prior Japanese Patent Application No. 2007-144323, filed May 31, 2007, the entire contents of which are incorporated herein by reference.

BACKGROUND OF THE INVENTION

The present invention relates to a step automatic transmission employed as a transmission for vehicle.

Japanese Patent Application Publication No. 2004-176765 or U.S. Pat. No. 6,648,791 (FIG. 23 and FIG. 25) discloses an automatic transmission adapted to achieve seven forward speed-ratios by using three planetary gear sets. In the automatic transmission disclosed in the above Japanese Patent Application, the seven forward speed-ratios are obtained by using six friction elements and three single-pinion-type planetary gear sets. The single-pinion-type planetary gear set has an advantage in gear noise and also an advantage in durability because of the non necessity for reducing a diameter of pinion gear. Moreover similarly, in the automatic transmission disclosed in the above United States Patent, the seven forward speed-ratios are obtained by using five friction elements and three single-pinion-type planetary gear sets.

SUMMARY OF THE INVENTION

However, in the technique disclosed in the above Japanese Patent Application, at least six friction elements are necessary to achieve the seven forward speed-ratios. Therefore, there is a problem that the number of friction elements is large so that an increase of the number of components and an increase in axial length are incurred.

Since the number of friction elements provided for achieving the seven forward speed-ratios is five in the technique of the above United States Patent, there is an advantage that the number of friction elements is small as compared with that of the above Japanese Patent Application, so that the number of components can be reduced. However, all of these five friction elements are clutches each adapted to engage rotating elements with each other. Generally in order to operate a clutch, a structure causing oil to be supplied through a rotating member to a piston hydraulic chamber for the clutch is employed. Hence, a clutch needs the larger number of seals than a brake even though each of the clutch and brake belongs to a kind of friction element. Therefore, since the proportion of clutches to total number of friction elements is high, there is a problem that an increase in sliding resistance due to the sealing causes a worsening of fuel economy in the technique of the above United States Patent. Furthermore, since a clutch has a structure connecting rotating members with each other, a mechanism for canceling a centrifugal force is necessary in order to properly control a hydraulic pressure of the clutch. Therefore, the automatic transmission disclosed in the above United States Patent has a problem that the increase of the number of components and the increase in axial length are caused since the proportion of clutches to the total number of friction elements is high.

It is an object of the present invention to provide an automatic transmission, devised to achieve the seven forward speed-ratios by means of three simple planetary gear sets and five friction elements and to reduce the number of clutches among the five friction elements.

According to one aspect of the present invention, there is provided an automatic transmission comprising: a first planetary gear set including a first sun gear, a first pinion engaged with the first sun gear, a first carrier supporting the first pinion, and a first ring gear engaged with the first pinion; a second planetary gear set including a second sun gear, a second pinion engaged with the second sun gear, a second carrier supporting the second pinion, and a second ring gear engaged with the second pinion; a third planetary gear set including a third sun gear, a third pinion engaged with the third sun gear, a third carrier supporting the third pinion, and a third ring gear engaged with the third pinion; an input shaft constantly connected with the second sun gear; an output shaft constantly connected with the first ring gear and the third ring gear; and at least five friction elements including a first clutch adapted to selectively connect the first carrier with the second carrier, a first brake adapted to selectively stop a rotation of the second carrier, a second brake adapted to selectively stop a rotation of a rotating member having the first sun gear, the second ring gear, and the third carrier, a third brake adapted to selectively stop a rotation of the third sun gear, and a second clutch adapted to selectively connect the first carrier with the second sun gear, the automatic transmission being adapted to achieve at least seven forward speed-ratios and one reverse speed-ratio, each of the at least seven forward speed-ratios and one reverse speed-ratio being achieved by engaging two friction elements selected from the first and second clutches and the first to third brakes.

According to another aspect of the present invention, there is provided an automatic transmission comprising: a first planetary gear set including a first sun gear, a first pinion engaged with the first sun gear, a first carrier supporting the first pinion, and a first ring gear engaged with the first pinion; a second planetary gear set including a second sun gear, a second pinion engaged with the second sun gear, a second carrier supporting the second pinion, and a second ring gear engaged with the second pinion; a third planetary gear set including a third sun gear whose rotation is constantly in stopped state, a third pinion engaged with the third sun gear, a third carrier supporting the third pinion, and a third ring gear engaged with the third pinion; an input shaft constantly connected with the second sun gear; an output shaft constantly connected with the first ring gear; and at least five friction elements including a first clutch adapted to selectively connect the first carrier with the second carrier, a first brake adapted to selectively stop a rotation of the second carrier, a second brake adapted to selectively stop a rotation of a rotating member having the first sun gear, the second ring gear, and the third carrier, a second clutch adapted to selectively connect the first carrier with the second sun gear, and a third clutch adapted to selectively connect the third ring gear with the first ring gear, the automatic transmission being adapted to achieve at least seven forward speed-ratios and one reverse speed-ratio, each of the at least seven forward speed-ratios and one reverse speed-ratio being achieved by engaging two friction elements selected from the first to third clutches and the first and second brakes.

According to still another aspect of the present invention, there is provided an automatic transmission comprising: a first planetary gear set including a first sun gear whose rotation is constantly in stopped state, a first pinion engaged with the first sun gear, a first carrier supporting the first pinion, and a first ring gear engaged with the first pinion; a second planetary gear set including a second sun gear constantly connected with the first carrier, a second pinion engaged with the second sun gear, a second carrier supporting the second pinion, and a second ring gear engaged with the second pinion; a third planetary gear set including a third sun gear, a third pinion engaged with the third sun gear, a third carrier supporting the third pinion, and a third ring gear engaged with the third pinion; an input shaft constantly connected with the first ring gear; an output shaft constantly connected with the third ring gear; and at least five friction elements including a first clutch adapted to selectively connect the second carrier with the third carrier, a first brake adapted to selectively stop a rotation of the second carrier, a second brake adapted to selectively stop a rotation of a first rotating member having the second ring gear and the third sun gear, a second clutch adapted to selectively connect the first ring gear with the third carrier, and a third clutch adapted to selectively connect the first rotating member with the third carrier, the automatic transmission being adapted to achieve at least seven forward speed-ratios and one reverse speed-ratio, each of the at least seven forward speed-ratios and one reverse speed-ratio being achieved by engaging two friction elements selected from the first to third clutches and the first and second brakes.

The other objects and features of this invention will become understood from the following description with reference to the accompanying drawings.

DETAILED DESCRIPTION OF THE INVENTION

Reference will hereinafter be made to the drawings in order to facilitate a better understanding of the present invention.

First Embodiment

Figure 1:
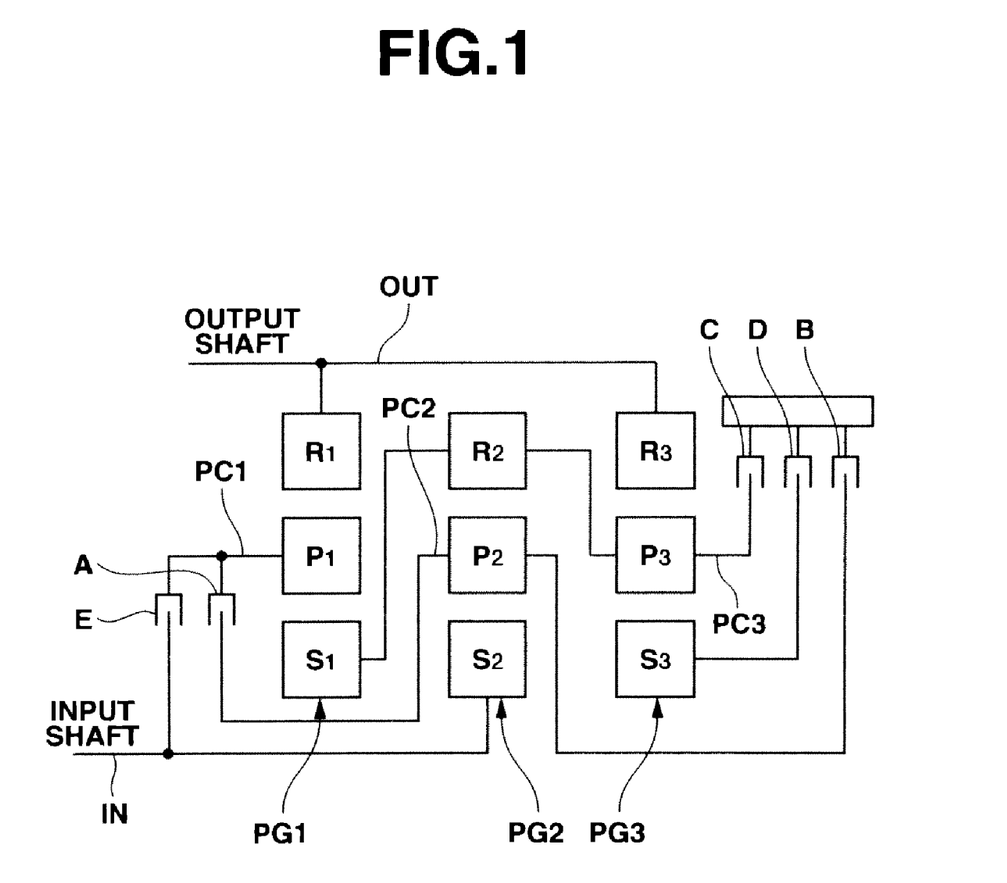
FIG. 1 is a skeleton diagram showing an automatic transmission according to a first embodiment of the present invention.

At first, structures of a shift mechanism of a step automatic transmission according to a first embodiment of the present invention will now be explained. FIG. 1 is a skeleton diagram showing the shift mechanism of the step (multiple-step type) automatic transmission according to the first embodiment.

Figure 2:
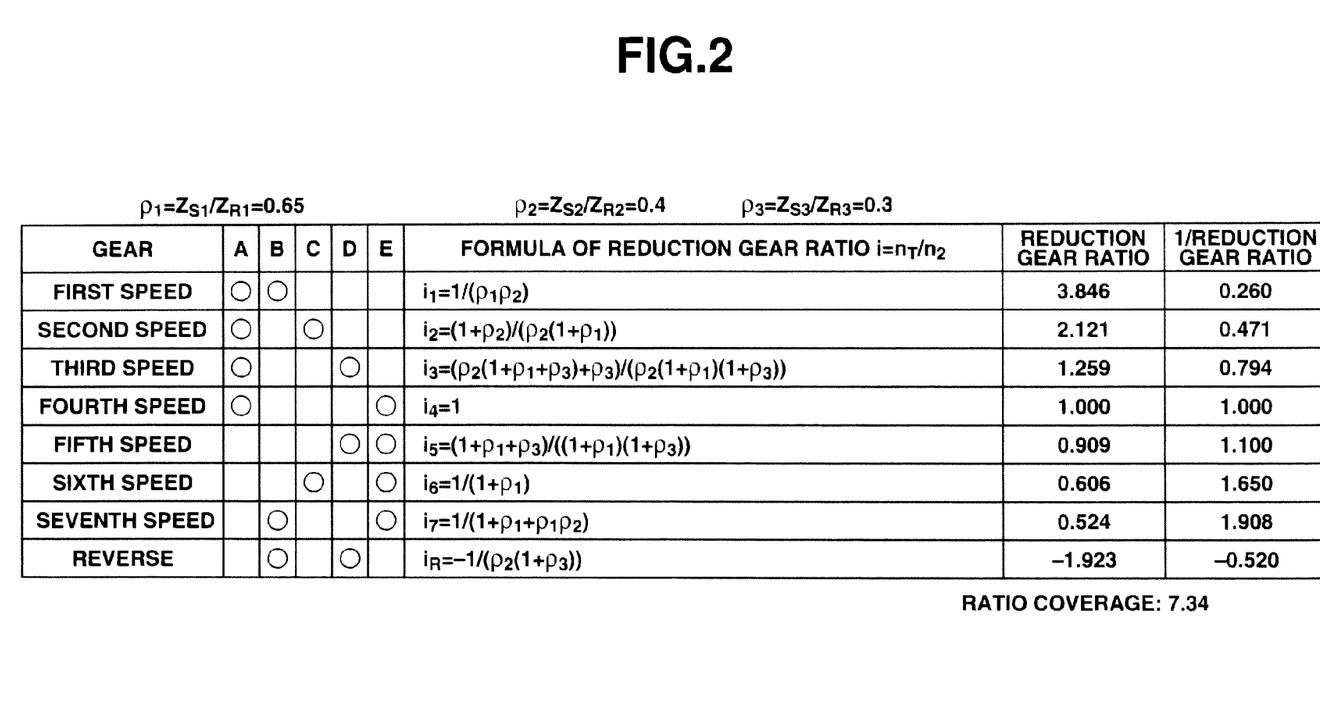
FIG. 2 is a diagram showing a concrete example of an engagement table of friction elements and reduction gear ratios in the automatic transmission according to the first embodiment.

FIG. 2 is a diagram showing a concrete example of a table regarding engagements of friction elements and reduction gear ratios (speed reducing ratios) in the automatic transmission according to the first embodiment.

The automatic transmission according to the first embodiment includes a first planetary gear set PG1, a second planetary gear set PG2 and a third planetary gear set PG3, as a gear train, as shown in FIG. 1. Each of the three planetary gear sets PG1, PG2 and PG3 is of single-pinion type. First planetary gear set PG1 includes a first sun gear S1, a first ring gear R1, and a first pinion P1 engaged or meshed with first sun gear S1 and first ring gear R1. Second planetary gear set PG2 includes a second sun gear S2, a second ring gear R2, and a second pinion P2 engaged with second sun gear S2 and second ring gear R2. Third planetary gear set PG3 includes a third sun gear S3, a third ring gear R3, and a third pinion P3 engaged with third sun gear S3 and third ring gear R3. First, second and third pinions P1 to P3 are supported rotatably relative to a first carrier PC1, a second carrier PC2 and a third carrier PC3, respectively. Namely, each carrier PC1, PC2 or PC3 pivotally supports the corresponding pinion P1, P2 or P3.

An input shaft IN is always connected (or engaged) with second sun gear S2 (i.e., constantly rotates together with second sun gear S2). An output shaft OUT is always connected with first ring gear R1 and third ring gear R3. First sun gear S1 is always connected with second ring gear R2. Further, second ring gear R2 is always connected with third carrier PC3.

The automatic transmission further includes two clutches A and E and three brakes B, C and D. The first clutch A is provided between first carrier PC1 and second carrier PC2, and is adapted to selectively connect or engage first carrier PC1 with second carrier PC2. The first brake B is provided between second carrier PC2 and a transmission case, and is adapted to selectively lock (stop) a rotation of second carrier PC2 relative to the transmission case (i.e., selectively fasten second carrier PC2 to the transmission case). The second brake C is provided between third carrier PC3 and the transmission case, and is adapted to selectively lock the rotation of a rotating member (aggregative elements) composed of first sun gear S1, second ring gear R2 and third carrier PC3, relative to the transmission case (i.e., selectively fasten the aggregative rotating elements to the transmission case). The third brake D is provided between third sun gear S3 and the transmission case, and is adapted to selectively lock a rotation of third sun gear S3 relative to the transmission case (i.e., selectively fasten third sun gear S3 to the transmission case). The second clutch E is provided between first carrier PC1 and input shaft IN, and is adapted to selectively connect first carrier PC1 with second sun gear S2.

Output shaft OUT is provided with an output gear or the like to transmit a rotational driving force through a differential and a drive shaft to a drive wheel which are not shown. First ring gear R1 and third ring gear R3 which are connected with output shaft OUT are located on a radially-outer side of a member provided between second carrier PC2 and first brake B, at an axially-opposite end portion of automatic transmission relative to input shaft IN in FIG. 1. Hence, the output of automatic transmission cannot be derived coaxially to input shaft IN from the side axially-opposite to input shaft IN in this FIG. 1. Therefore, FIG. 1 is based on an assumption that the automatic transmission is designed to be mainly mounted in a FF vehicle (front-engine front-drive vehicle). However, a vehicle in which the automatic transmission according to the first embodiment can be mounted is not limited to the FF vehicle.

The relations in engagements (connections) of the friction elements under respective speed ratios (gear ratios) will be explained below referring to the engagement table of FIG. 2 (these engagements for respective speed ratios are attained by a shift control section or means). In the table of FIG. 2, the sign ○ represents the engagement (engaged state), and the blank represents the disengagement (released state).

At first, the states at the time of forward running will now be explained. A first-speed (first-speed ratio) is achieved by engaging first clutch A and first brake B. A second-speed is achieved by engaging first clutch A and second brake C. A third-speed is achieved by engaging first clutch A and third brake D. A fourth-speed is achieved by engaging first clutch A and second clutch E. A fifth-speed is achieved by engaging second clutch E and third brake D. A sixth-speed is achieved by engaging second clutch E and second brake C. A seventh-speed is achieved by engaging second clutch E and first brake B. Next, the state at the time of reverse running is now explained. A reverse-speed is achieved by engaging first brake B and third brake D.

Next, a concrete example of the reduction gear ratios according to the first embodiment will now be explained referring to FIG. 2. The following explanations are given in the case where a gear ratio $\rho_1 = Z_{S1}/Z_{R1}$ of first planetary gear set PG1 is equal to 0.65 (i.e., $\rho_1 = Z_{S1}/Z_{R1} = 0.65$), a gear ratio $\rho_2 = Z_{S2}/Z_{R2}$ of second planetary gear set PG2 is equal to 0.4 (i.e., $\rho_2 = Z_{S2}/Z_{R2} = 0.4$), and a gear ratio $\rho_3 = Z_{S3}/Z_{R3}$ of third planetary gear set PG3 is equal to 0.3 (i.e., $\rho_3 = Z_{S3}/Z_{R3} = 0.3$). Where, each of $Z_{S1}$, $Z_{S2}$, $Z_{S3}$, $Z_{R1}$, $Z_{R2}$ and $Z_{R3}$ represents the number of teeth of the corresponding gear.

A reduction gear ratio $i_1$ of the first-speed in the forward running is expressed by a formula: $i_1 = 1/(\rho_1 \times \rho_2)$. By assigning the concrete numerical values to this formula, reduction gear ratio $i_1$ of the forward first-speed is calculated as $i_1 = 3.846$. The inverse of reduction gear ratio $i_1$ is equal to 0.260.

A reduction gear ratio $i_2$ of the second-speed in the forward running is expressed by a formula: $i_2 = (1+\rho_2)/(\rho_2(1+\rho_1))$. By assigning the concrete numerical values to this formula, reduction gear ratio $i_2$ of the forward second-speed is calculated as $i_2 = 2.121$. The inverse of reduction gear ratio $i_2$ is equal to 0.471.

A reduction gear ratio $i_3$ of the third-speed in the forward running is expressed by a formula: $i_3 = (\rho_2(1+\rho_1+\rho_3)+\rho_3)/(\rho_2(1+\rho_1)(1+\rho_3))$. By assigning the concrete numerical values to this formula, reduction gear ratio $i_3$ of the forward third-speed is calculated as $i_3 = 1.259$. The inverse of reduction gear ratio $i_3$ is equal to 0.794.

A reduction gear ratio $i_4$ of the fourth-speed in the forward running is expressed by a formula: $i_4 = 1$. Without assigning the concrete numerical values to this formula, reduction gear ratio $i_4$ of the forward fourth-speed is equal to 1.000. The inverse of reduction gear ratio $i_4$ is equal to 1.000.

A reduction gear ratio $i_5$ of the fifth-speed in the forward running is expressed by a formula: $i_5 = (1+\rho_1+\rho_3)/((1+\rho_1)(1+\rho_3))$. By assigning the concrete numerical values to this formula, reduction gear ratio $i_5$ of the forward fifth-speed is calculated as $i_5 = 0.909$. The inverse of reduction gear ratio $i_5$ is equal to 1.100.

A reduction gear ratio $i_6$ of the sixth-speed in the forward running is expressed by a formula: $i_6 = 1/(1+\rho_1)$. By assigning the concrete numerical values to this formula, reduction gear ratio $i_6$ of the forward sixth-speed is calculated as $i_6 = 0.606$. The inverse of reduction gear ratio $i_6$ is equal to 1.650.

A reduction gear ratio $i_7$ of the seventh-speed in the forward running is expressed by a formula: $i_7 = 1/(1+\rho_1+\rho_1\rho_2)$. By assigning the concrete numerical values to this formula, reduction gear ratio $i_7$ of the forward seventh-speed is calculated as $i_7 = 0.524$. The inverse of reduction gear ratio $i_7$ is equal to 1.908.

A reduction gear ratio $i_R$ of the reverse-speed is expressed by a formula: $i_R = -1/\rho_2(1+\rho_3)$. By assigning the concrete numerical values to this formula, reduction gear ratio $i_R$ of the reverse-speed is calculated as $i_R = -1.923$. The inverse of reduction gear ratio $i_R$ is equal to $-0.520$.

Effects According to the First Embodiment

① Effects by Virtue of the Usage of Three Simple Planetary Gear Sets

Because of the usage of the three sets of simple (single) planet gears (the usage of three single-pinion-type planetary gear sets), a worsening in gear noise can be suppressed as compared with the case where double pinions (double-pinion-type planetary gear set) are used. Further, because a diameter of the pinion does not need to be reduced in this embodiment, a worsening in gear durability can be suppressed.

② Effects from a Viewpoint of the Number of Friction Elements

The number of friction elements in the first embodiment is five, namely the friction elements in the first embodiment are first clutch A, second clutch E, first brake B, second brake C and third brake D. These five friction elements are composed of two clutches and three brakes. By means of these five elements, the seven speeds of forward running and the one speed of reverse running can be obtained. Since the number of brakes is three against the number of all the friction elements, namely since the proportion of brakes to total number of friction elements is high; the increase of the number of sealings and the increase of centrifugal canceling mechanisms can be suppressed as compared with the case where the number of clutches is large. Thereby, the increase of the number of components, the increase of axial length and the increase of sliding resistance due to the sealing can be suppressed while enhancing a fuel economy.

③ Effects Based on a Ratio Coverage in the Forward Running

A ratio coverage (gear-ratio width) of the forward running is defined by dividing the reduction gear ratio of the lowest speed by the reduction gear ratio of the highest speed, i.e., the reduction gear ratio of the lowest speed/the reduction gear ratio of the highest speed. It can be determined that a degree of freedom to set the gear ratio (speed ratio) in respective forward speed-ratios becomes higher as the value of ratio coverage becomes greater. As concrete numerical values in the first embodiment, the reduction gear ratio of the forward first-speed is equal to 3.916 and the reduction gear ratio of the forward seventh-speed is equal to 0.554. In this embodiment, the ratio coverage from first-speed to seventh-speed is equal to 7.34, and hence a sufficient ratio coverage can be ensured. Therefore, for example, the automatic transmission according to the first embodiment is useful also as a transmission for a vehicle equipped with a diesel engine as its power source, although a width of rotational speed (number of revolutions) of diesel engine is narrower than that of a gasoline engine and a torque of diesel engine is lower than that of a gasoline engine having the same engine displacement.

④ Effects Based on the Number of Changeovers in the Friction Elements at the Time of Shift If one or more friction element is released and two or more friction elements are engaged at the time of shift, or if two or more friction elements are released and one or more friction element is engaged at the time of shift; a torque control and a control for the engaging and releasing timings of friction elements become complicated. Hence, from a viewpoint of avoidance of the complication of shift control, it is favorable that one friction element is released and one friction element is engaged at the time of shift. In the first embodiment, the shifts from the forward first-speed to the forward fourth-speed are performed under the condition where first clutch A is maintained in engaged state. Moreover, the shifts from the forward fourth-speed to the forward seventh-speed are performed under the condition where second clutch E is maintained in engaged state. Namely, each shift between adjacent two speed-ratios (gear-ratios) among the forward first- to seventh-speeds can be achieved by releasing one friction element and by engaging one friction element. Accordingly, each of all the shifts between adjacent two speed-ratios of the forward running is performed by means of only the changeover from one friction element to the other one friction element. Therefore, the control during the shift can be prevented from being complicated.

⑤ Effects Based on a Layout

In the automatic transmission according to the first embodiment, first clutch A and second clutch E are disposed intensively on the input-shaft side (in an area near input shaft IN) of the three planetary gear sets, as shown by the skeleton diagram of FIG. 1. Similarly, first brake B, second brake C and third brake D are disposed intensively on the opposite side of the three planetary gear sets relative to the locations of first clutch A and second clutch E. An engaging hydraulic pressure or the like needs to be supplied to each of clutches and brakes, and an oil passage for supplying the hydraulic pressure needs to be provided from fixed members, as a matter of course. In this embodiment, the respective clutches and brakes are disposed by means of concentrated arrangement, axially outside the three planetary gear sets as mentioned above. Thereby, the distance between a wall of the fixed member formed with the oil passages and each of the clutches and brakes can be substantially equalized or shortened. By virtue of such layout, a routing of oil passages becomes easy with a superior controllability of the respective clutches and brakes.

Moreover, a rotating member passing on an outer peripheral side of the planetary gear sets is composed of only output shaft OUT in a single-layered structure, as shown by the skeleton diagram of FIG. 1. Generally in the automatic transmission, lubricating oil is always supplied to respective rotating elements such as gears and bearings for the purpose of cooling, lubrication and the like. This lubricating oil is generally supplied from a shaft-center side of the transmission by means of centrifugal force. At this time, if an efficiency of discharge of lubricating oil becomes worsened on the outer peripheral side of the planetary gear sets, the supply of the lubricating oil becomes impossible. Since the rotating member passing on the outer peripheral side of the planetary gear sets forms the single-layered structure in the first embodiment as mentioned above, the discharging efficiency of lubricating oil is not worsened so that the durability can be enhanced.

First Modified Example

Next, a first modified example of the first embodiment according to the present invention will now be explained.

Since a basic structure of the first modified example is same as that of the example explained above, only structural parts of the first modified example which are different from the above example are now explained.

Figure 3:
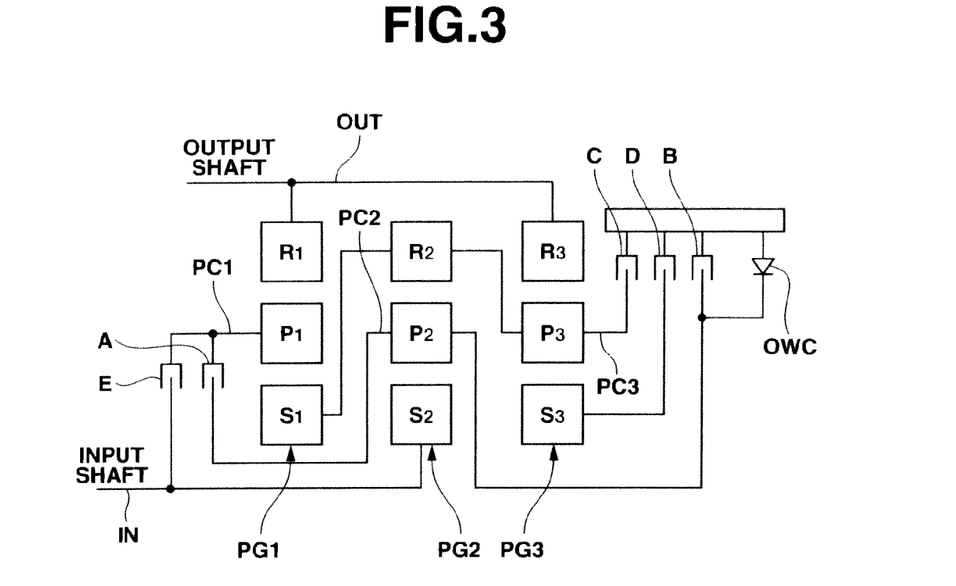
FIG. 3 is a skeleton diagram showing a first modified example of the first embodiment.

FIG. 3 is a skeleton diagram showing a shift mechanism of an automatic transmission of the first modified example. In the first modified example, a one-way clutch OWC is provided in parallel with first brake B.

In order to eliminate an excessive feeling of engine brake during a normal running or to simplify a shift control during the shift from the first-speed to the second-speed between which there is a great torque difference in level, it is favorable that one-way clutch OWC for the first-speed is provided. For such purpose, one-way clutch OWC for the first-speed is provided in parallel with a friction element which is released at the time of the upshift from first-speed to second-speed. In the case of first embodiment, first brake B corresponds to this friction element.

First brake B is adapted to selectively fasten second carrier PC2 to the transmission case, and second carrier PC2 rotates in a positive direction (a rotational direction of engine is defined as the positive direction) at the time of shift from the first-speed to the second-speed. In order to install one-way clutch OWC to first brake B, it is necessary that the rotational direction of second carrier PC2 is positive under all the speed-ratios causing first brake B to be released. In case that second carrier PC2 rotates in a negative direction under any speed-ratio, it is necessary that one more friction element capable of switching between an active state and an inactive state (connected and unconnected states) of this one-way clutch OWC is added in series with one-way clutch OWC. In this case, the increase of the number of components and the like is incurred so that the usefulness of the installation of one-way clutch OWC becomes relatively low.

In the first embodiment, it is recognized that second carrier PC2 rotates in the positive direction under all the speed-ratios, by checking the rotational speeds (each number of revolutions) of second carrier PC2 under all the speed-ratios. Therefore, in the first embodiment, just only by providing one-way clutch OWC in parallel with first brake B; the simplification of control logic can be achieved without greatly increasing the number of components, and the excessive feeling of engine brake can be suppressed during the normal running of vehicle.

Second Embodiment

Figure 4:
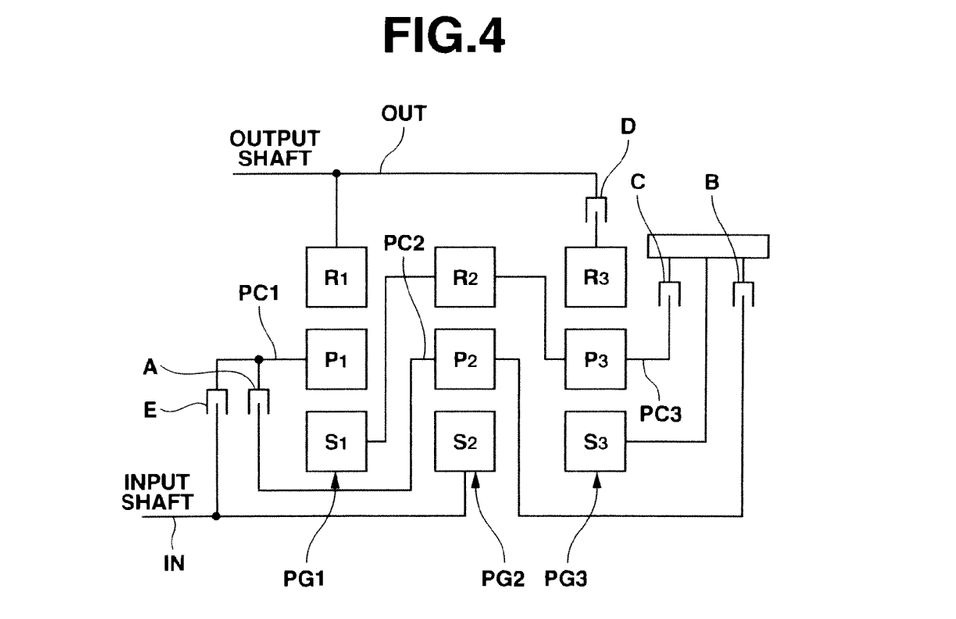
FIG. 4 is a skeleton diagram showing an automatic transmission according to a second embodiment of the present invention.

Next, a second embodiment according to the present invention will now be explained. A structure of the second embodiment is same as that of the first embodiment for the point that the automatic transmission includes three planetary gear sets and for the point that the total number of friction elements is five. However, the structure of the second embodiment is different from that of the first embodiment for the point that a third clutch D is provided instead of third brake D. The following explanations for the second embodiment will be given with a central focus on the different points.

FIG. 4 is a skeleton diagram showing the shift mechanism of an automatic transmission according to the second embodiment. Input shaft IN is always connected with second sun gear S2. Output shaft OUT is always connected with first ring gear R1. First sun gear S1 is always connected with second ring gear R2 (i.e., constantly rotates together with second ring gear R2). Second ring gear R2 is always connected with third carrier PC3. Third sun gear S3 is always fastened or locked to the transmission case. That is, the rotation of third sun gear S3 is constantly in stopped state.

The automatic transmission includes three clutches A, D and E and two brakes B and C. The first clutch A is provided between first carrier PC1 and second carrier PC2, and is adapted to selectively connect first carrier PC1 with second carrier PC2. The first brake B is provided between second carrier PC2 and the transmission case, and is adapted to selectively lock the rotation of second carrier PC2 relative to the transmission case (i.e., selectively fasten second carrier PC2 to the transmission case). The second brake C is provided between third carrier PC3 and the transmission case, and is adapted to selectively lock the rotation of a rotating member (aggregative elements) composed of first sun gear S1, second ring gear R2 and third carrier PC3, relative to the transmission case (i.e., selectively fasten the aggregative rotating elements to the transmission case). The third clutch D is provided between third ring gear R3 and first ring gear R1, and is adapted to selectively connect third ring gear R3 with first ring gear R1. The second clutch E is provided between first carrier PC1 and input shaft IN, and is adapted to selectively connect first carrier PC1 with second sun gear S2.

Figure 5:
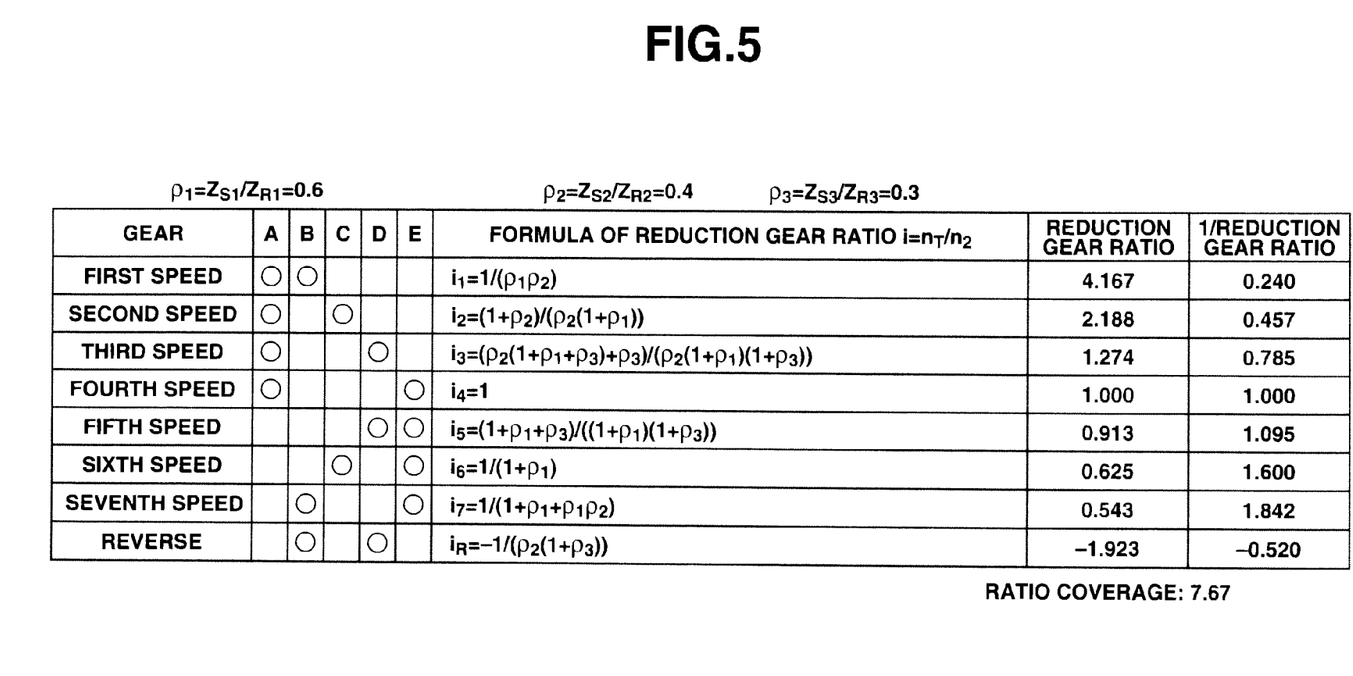
FIG. 5 is a diagram showing a concrete example of an engagement table of friction elements and reduction gear ratios in the automatic transmission according to the second embodiment.

The relations in engagements (connections) of the friction elements in respective speed ratios will be explained below referring to the engagement table of FIG. 5 (these engagements for respective speed ratios are attained by the shift control section or means). In the table of FIG. 5, the sign ◯ represents the engagement, and the blank represents the disengagement.

At first, the states at the time of forward running will now be explained. The first-speed (first-speed ratio) is achieved by engaging first clutch A and first brake B. The second-speed is achieved by engaging first clutch A and second brake C. The third-speed is achieved by engaging first clutch A and third clutch D. The fourth-speed is achieved by engaging first clutch A and second clutch E. The fifth-speed is achieved by engaging second clutch E and third clutch D. The sixth-speed is achieved by engaging second clutch E and second brake C. The seventh-speed is achieved by engaging second clutch E and first brake B. Next, the state at the time of reverse running is now explained. The reverse-speed is achieved by engaging first brake B and third clutch D.

Next, a concrete example of the reduction gear ratios according to the second embodiment will now be explained referring to FIG. 5. The following explanations are given in the case where gear ratio $\rho_1=Z_{S1}/Z_{R1}$ of first planetary gear set PG1 is equal to 0.6 (i.e., $\rho_1=Z_{S1}/Z_{R1}=0.6$), gear ratio $\rho_2=Z_{S2}/Z_{R2}$ of second planetary gear set PG2 is equal to 0.4 (i.e., $\rho_2=Z_{S2}/Z_{R2}=0.4$), and gear ratio $\rho_3=Z_{S3}/Z_{R3}$ of third planetary gear set PG3 is equal to 0.3 (i.e., $\rho_3=Z_{S3}/Z_{R3}=0.3$). Where, each of $Z_{S1}$, $Z_{S2}$, $Z_{S3}$, $Z_{R1}$, $Z_{R2}$ and $Z_{R3}$ represents the number of teeth of the corresponding gear.

Reduction gear ratio $i_1$ of the first-speed in the forward running is expressed by a formula: $i_1=1/(\rho_1 \times \rho_2)$. By assigning the concrete numerical values to this formula, reduction gear ratio $i_1$ of the forward first-speed is calculated as $i_1=4.167$. The inverse of reduction gear ratio $i_1$ is equal to 0.240.

Reduction gear ratio $i_2$ of the second-speed in the forward running is expressed by a formula: $i_2=(1+\rho_2)/(\rho_2(1+\rho_1))$. By assigning the concrete numerical values to this formula, reduction gear ratio $i_2$ of the forward second-speed is calculated as $i_2=2.188$. The inverse of reduction gear ratio $i_2$ is equal to 0.457.

Reduction gear ratio $i_3$ of the third-speed in the forward running is expressed by a formula: $i_3=(\rho_2(1+\rho_1+\rho_3)+\rho_3)/(\rho_2(1+\rho_1)(1+\rho_3))$. By assigning the concrete numerical values to this formula, reduction gear ratio $i_3$ of the forward third-speed is calculated as $i_3=1.274$. The inverse of reduction gear ratio $i_3$ is equal to 0.785.

Reduction gear ratio $i_4$ of the fourth-speed in the forward running is expressed by a formula: $i_4=1$. Without assigning the concrete numerical values to this formula, reduction gear ratio $i_4$ of the forward fourth-speed is equal to 1.000. The inverse of reduction gear ratio $i_4$ is equal to 1.000.

Reduction gear ratio $i_5$ of the fifth-speed in the forward running is expressed by a formula: $i_5=(1+\rho_1+\rho_3)/((1+\rho_1)(1+\rho_3))$. By assigning the concrete numerical values to this formula, reduction gear ratio $i_5$ of the forward fifth-speed is calculated as $i_5=0.913$. The inverse of reduction gear ratio $i_5$ is equal to 1.095.

Reduction gear ratio $i_6$ of the sixth-speed in the forward running is expressed by a formula: $i_6=1/(1+\rho_1)$. By assigning the concrete numerical values to this formula, reduction gear ratio $i_6$ of the forward sixth-speed is calculated as $i_6=0.625$. The inverse of reduction gear ratio $i_6$ is equal to 1.600.

Reduction gear ratio $i_7$ of the seventh-speed in the forward running is expressed by a formula: $i_7=1/(1+\rho_1+\rho_1\rho_2)$. By assigning the concrete numerical values to this formula, reduction gear ratio $i_7$ of the forward seventh-speed is calculated as $i_7=0.543$. The inverse of reduction gear ratio $i_7$ is equal to 1.842.

Reduction gear ratio $i_R$ of the reverse-speed is expressed by a formula: $i_R=-1/\rho_2(1+\rho_3)$. By assigning the concrete numerical values to this formula, reduction gear ratio $i_R$ of the reverse-speed is calculated as $i_R=-1.923$. The inverse of reduction gear ratio $i_R$ is equal to −0.520.

Effects According to the Second Embodiment

① Effects by Virtue of the Usage of the Three Simple Planetary Gear Sets

Because of the usage of the three sets of simple (single) planet gears (the usage of three single-pinion-type planetary gear sets), a worsening in gear noise can be suppressed as compared with the case where double pinions (double-pinion-type planetary gear set) are used. Further, because a diameter of the pinion does not need to be reduced in this embodiment, a worsening in gear durability can be suppressed.

② Effects from a Viewpoint of the Number of Friction Elements

The number of friction elements in the second embodiment is five, namely the friction elements in the second embodiment are first clutch A, second clutch E, third clutch D, first brake B and second brake C. These five friction elements are composed of three clutches and two brakes. By means of these five elements, the seven speeds of forward running and the one speed of reverse running can be obtained. Since the number of brakes is two against the number of all the friction elements, namely since the proportion of brakes to the total number of friction elements is high; the increase of the number of seals and the increase of centrifugal canceling mechanisms can be suppressed as compared with the case where the number of clutches is large. Thereby, the increase of the number of components and the increase in axial length can be suppressed while enhancing a fuel economy.

③ Effects Based on the Ratio Coverage in the Forward Running

As concrete numerical values in the second embodiment, the reduction gear ratio of the forward first-speed is equal to 4.167 and the reduction gear ratio of the forward seventh-speed is equal to 0.543. In this embodiment, the ratio coverage from first-speed to seventh-speed is equal to 7.67, and hence a sufficient ratio coverage can be ensured.

④ Effects Based on the Number of Changeovers in the Friction Elements at the Time of Shift In the second embodiment, the shifts between the first-speed and the fourth-speed during the forward running are performed under the condition where first clutch A is maintained in engaged state. Moreover, the shifts between the forward fourth-speed and the forward seventh-speed are performed under the condition where second clutch E is maintained in engaged state. That is, each shift between adjacent two speed-ratios or each one-ratio-skip shift (e.g., first-speed→third-speed) among the forward first- to seventh-speeds can be achieved by releasing one friction element and by engaging one friction element. Accordingly, each of all the shifts between adjacent two speed-ratios of the forward running or each of all the one-ratio-skip shifts of the forward running is performed by means of only the changeover from one friction element to the other friction element. Therefore, the control during the shift can be prevented from being complicated.

⑤ Effects Based on a Layout

In the automatic transmission according to the second embodiment, first clutch A and second clutch E are disposed intensively on the input-shaft side (in an area near input shaft IN) of the three planetary gear sets, as shown by the skeleton diagram of FIG. 4. Similarly, first brake B, second brake C and third clutch D are disposed intensively on the opposite side of the three planetary gear sets relative to the locations of first clutch A and second clutch E. Thereby, the distance between the fixed wall formed with the oil passages and each of the clutches and brakes can be substantially equalized or shortened. By virtue of such layout, a routing of oil passages becomes easy with a superior controllability of the respective clutches and brakes.

Moreover, a rotating member passing on an outer peripheral side of the planetary gear sets is composed of only output shaft OUT in a single-layered structure, as shown by the skeleton diagram of FIG. 4. Accordingly, the discharging efficiency of lubricating oil is not worsened so that the durability can be enhanced.

Second Modified Example

Next, a second modified example of the second embodiment according to the present invention will now be explained. Since a basic structure of the second modified example is same as that of the above example explained in the second embodiment, only structural parts of the second modified example which are different from the above example are now explained below.

Figure 6:
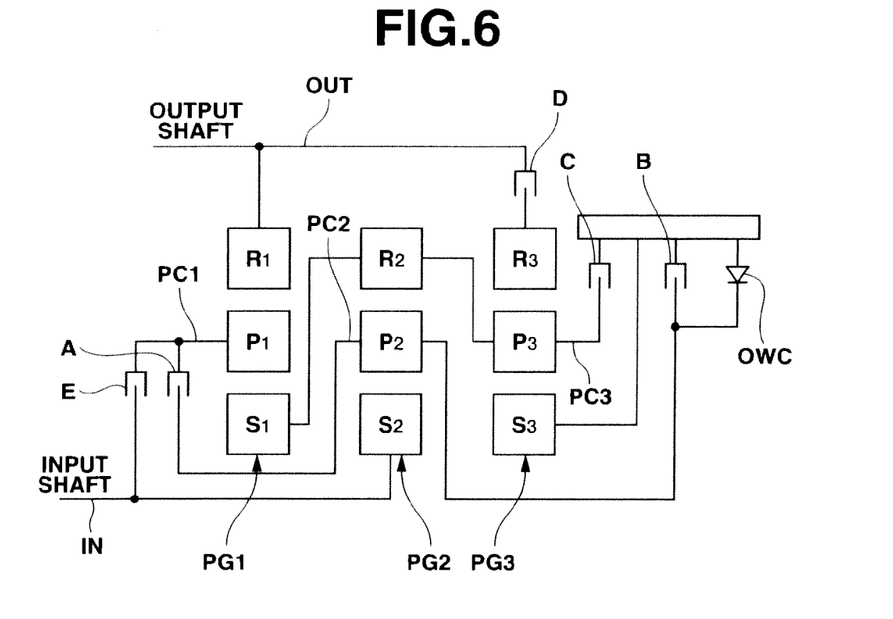
FIG. 6 is a skeleton diagram showing a second modified example of the second embodiment.

FIG. 6 is a skeleton diagram showing a shift mechanism of an automatic transmission of the second modified example. In the second modified example, one-way clutch OWC is provided in parallel with first brake B. In the second embodiment, it is recognized that second carrier PC2 rotates in the positive direction under all the speed-ratios, by checking the rotational speeds (each number of revolutions) of second carrier PC2 under all the speed-ratios. Therefore, in the second embodiment, just only by providing one-way clutch OWC in parallel with first brake B; the simplification of control logic can be achieved without greatly increasing the number of components, and the excessive engine-brake feeling can be suppressed during the normal running of vehicle.

Third Embodiment

Figure 7:
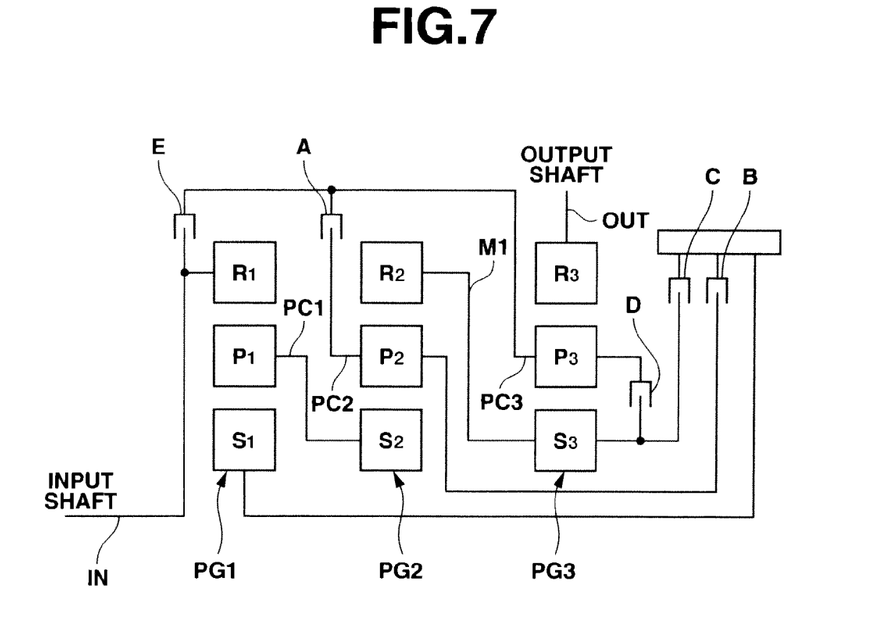
FIG. 7 is a skeleton diagram showing an automatic transmission according to a third embodiment of the present invention.

Next, a third embodiment according to the present invention will now be explained. A structure of the third embodiment is same as that of the first embodiment for the point that the automatic transmission includes three planetary gear sets and for the point that the total number of friction elements is five. However, the structure of the third embodiment is different from that of the first embodiment for the point that a third clutch D is provided instead of third brake D. The following explanations for the third embodiment will be given with a central focus on the different points.

FIG. 7 is a skeleton diagram showing the shift mechanism of an automatic transmission according to the third embodiment. Input shaft IN is always connected with first ring gear R1. Output shaft OUT is always connected with third ring gear R3. First sun gear S1 is always fastened or locked to the transmission case, that is, the rotation of first sun gear S1 is constantly in stopped state. First carrier PC1 is always connected with second sun gear S2. Third sun gear S3 is always connected with second ring gear R2 to define a first rotating member M1.

The automatic transmission includes three clutches A, D and E and two brakes B and C. The first clutch A is provided between second carrier PC2 and third carrier PC3, and is adapted to selectively connect second carrier PC2 with third carrier PC3. The second clutch E is provided between first ring gear R1 and third carrier PC3, and is adapted to selectively connect first ring gear R1 with third carrier PC3. The first brake B is provided between second carrier PC2 and the transmission case, and is adapted to selectively lock the rotation of second carrier PC2 relative to the transmission case (i.e., selectively fasten second carrier PC2 to the transmission case). The second brake C is provided between third sun gear S3 and the transmission case, and is adapted to selectively lock the rotation of first rotating member M1 relative to the transmission case (i.e., selectively fasten first rotating member M1 to the transmission case). The third clutch D is provided between third sun gear S3 and third carrier PC3, and is adapted to selectively connect third sun gear S3 with third carrier PC3.

Figure 8:
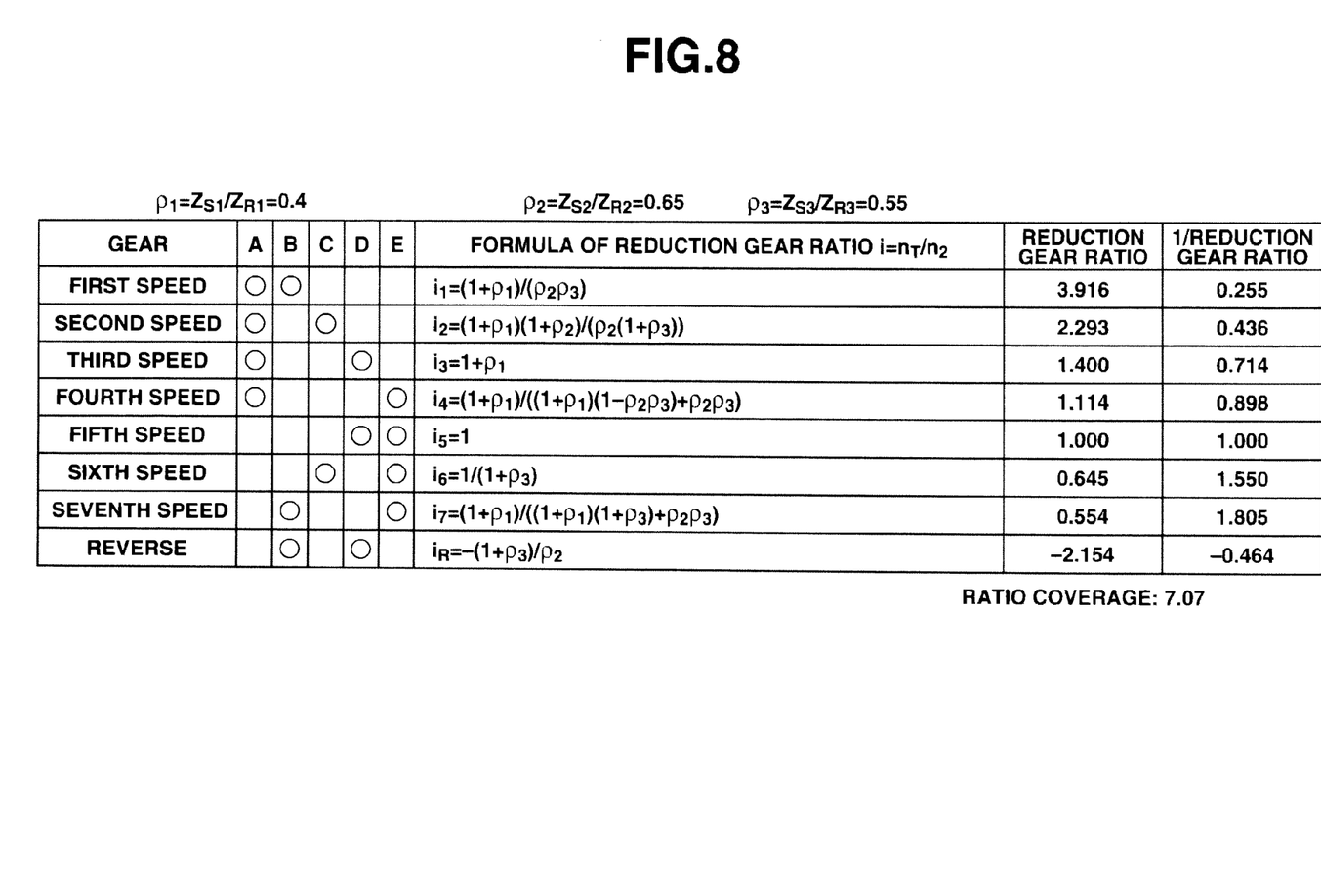
FIG. 8 is a diagram showing a concrete example of an engagement table of friction elements and reduction gear ratios in the automatic transmission according to the third embodiment.

The relations in engagements (connections) of the friction elements in respective speed ratios will be explained below referring to the engagement table of FIG. 8 (these engagements for respective speed ratios are attained by the shift control section or means). In the table of FIG. 8, the sign ○ represents the engagement, and the blank represents the disengagement.

At first, the states at the time of forward running will now be explained. The first-speed (first-speed ratio) is achieved by engaging first clutch A and first brake B. The second-speed is achieved by engaging first clutch A and second brake C. The third-speed is achieved by engaging first clutch A and third clutch D. The fourth-speed is achieved by engaging first clutch A and second clutch E. The fifth-speed is achieved by engaging second clutch E and third clutch D. The sixth-speed is achieved by engaging second clutch E and second brake C. The seventh-speed is achieved by engaging second clutch E and first brake B. Next, the state at the time of reverse running is now explained. The reverse-speed is achieved by engaging first brake B and third clutch D.

Next, a concrete example of the reduction gear ratios according to the third embodiment will now be explained referring to FIG. 8. The following explanations are given in the case where gear ratio $\rho_1 = Z_{S1}/Z_{R1}$ of first planetary gear set PG1 is equal to 0.4 (i.e., $\rho_1 = Z_{S1}/Z_{R1} = 0.4$), gear ratio $\rho_2 = Z_{S2}/Z_{R2}$ of second planetary gear set PG2 is equal to 0.65 (i.e., $\rho_2 = Z_{S2}/Z_{R2} = 0.65$), and gear ratio $\rho_3 = Z_{S3}/Z_{R3}$ of third planetary gear set PG3 is equal to 0.55 (i.e., $\rho_3 = Z_{S3}/Z_{R3} = 0.55$). Where, each of $Z_{S1}$, $Z_{S2}$, $Z_{S3}$, $Z_{R1}$, $Z_{R2}$ and $Z_{R3}$ represents the number of teeth of the corresponding gear.

Reduction gear ratio $i_1$ of the first-speed in the forward running is expressed by a formula: $i_1 = (1+\rho_1)/(\rho_2 \times \rho_3)$. By assigning the concrete numerical values to this formula, reduction gear ratio $i_1$ of the forward first-speed is calculated as $i_1 = 3.916$. The inverse of reduction gear ratio $i_1$ is equal to 0.255.

Reduction gear ratio $i_2$ of the second-speed in the forward running is expressed by a formula: $i_2 = (1+\rho_1)(1+\rho_2)/(\rho_2(1+\rho_3))$. By assigning the concrete numerical values to this formula, reduction gear ratio $i_2$ of the forward second-speed is calculated as $i_2 = 2.293$. The inverse of reduction gear ratio $i_2$ is equal to 0.436.

Reduction gear ratio $i_3$ of the third-speed in the forward running is expressed by a formula: $i_3 = 1+\rho_1$. By assigning the concrete numerical values to this formula, reduction gear ratio $i_3$ of the forward third-speed is calculated as $i_3 = 1.400$. The inverse of reduction gear ratio $i_3$ is equal to 0.714.

Reduction gear ratio $i_4$ of the fourth-speed in the forward running is expressed by a formula: $i_4 = (1+\rho_1)/((1+\rho_1)(1-\rho_2\rho_3)+\rho_2\rho_3)$. By assigning the concrete numerical values to this formula, reduction gear ratio $i_4$ of the forward fourth-speed is equal to 1.114. The inverse of reduction gear ratio $i_4$ is equal to 0.898.

Reduction gear ratio $i_5$ of the fifth-speed in the forward running is expressed by a formula: $i_5 = 1$. Without assigning the concrete numerical values to this formula, reduction gear ratio $i_5$ of the forward fifth-speed is calculated as $i_5 = 1.000$. The inverse of reduction gear ratio $i_5$ is equal to 1.000.

Reduction gear ratio $i_6$ of the sixth-speed in the forward running is expressed by a formula: $i_6 = 1/(1+\rho_3)$. By assigning the concrete numerical values to this formula, reduction gear ratio $i_6$ of the forward sixth-speed is calculated as $i_6 = 0.645$. The inverse of reduction gear ratio $i_6$ is equal to 1.550.

Reduction gear ratio $i_7$ of the seventh-speed in the forward running is expressed by a formula: $i_7 = (1+\rho_1)/((1+\rho_1)(1+\rho_3)+\rho_2\rho_3)$. By assigning the concrete numerical values to this formula, reduction gear ratio $i_7$ of the forward seventh-speed is calculated as $i_7 = 0.554$. The inverse of reduction gear ratio $i_7$ is equal to 1.805.

Reduction gear ratio $i_R$ of the reverse-speed is expressed by a formula: $i_R = -(1+\rho_3)/\rho_2$. By assigning the concrete numerical values to this formula, reduction gear ratio $i_R$ of the reverse-speed is calculated as $i_R = -2.154$. The inverse of reduction gear ratio $i_R$ is equal to $-0.464$.

Effects According to the Third Embodiment

① Effects by Virtue of the Usage of the Three Simple Planetary Gear Sets

Because of the usage of the three sets of single planet gears (the usage of three single-pinion-type planetary gear sets), a worsening in gear noise can be suppressed as compared with the case where double pinions (double-pinion-type planetary gear set) are used. Further, because a diameter of the pinion does not need to be reduced in this embodiment, a worsening in gear durability can be suppressed.

② Effects from a Viewpoint of the Number of Friction Elements

The number of friction elements in the third embodiment is five, namely the friction elements in the third embodiment are first clutch A, second clutch E, third clutch D, first brake B and second brake C. These five friction elements are composed of three clutches and two brakes. By means of these five elements, the seven speeds of forward running and the one speed of reverse running can be obtained. Since the number of brakes is two against the number of all the friction elements, namely since the proportion of brakes to the total number of friction elements is high; the increase of the number of sealings and the increase of centrifugal canceling mechanisms can be suppressed as compared with the case where the number of clutches is large. Thereby, the increase of the number of components and the increase in axial length can be suppressed while enhancing a fuel economy.

③ Effects Based on the Ratio Coverage in the Forward Running

As concrete numerical values in the third embodiment, the reduction gear ratio of the forward first-speed is equal to 3.846 and the reduction gear ratio of the forward seventh-speed is equal to 0.260. In this embodiment, the ratio coverage from first-speed to seventh-speed is equal to 7.07, and hence a sufficient ratio coverage can be ensured.

④ Effects Based on the Number of Changeovers in the Friction Elements at the Time of Shift In the third embodiment, the shifts between the forward first-speed and the forward fourth-speed are performed while maintaining first clutch A in engaged state. Moreover, the shifts between the forward fourth-speed and the forward seventh-speed are performed while maintaining second clutch E in engaged state. That is, each shift between adjacent two speed-ratios or each one-ratio-skip shift (e.g., first-speed→third-speed) among the forward first- to seventh-speeds can be achieved by releasing one friction element and by engaging one friction element. Accordingly, each of all the shifts between adjacent two speed-ratios of the forward running or each of all the one-ratio-skip shifts of the forward running is performed by means of only the changeover from one friction element to the other one friction element. Therefore, the control during the shift can be prevented from being complicated.

⑤ Effects Based on a Layout

In the automatic transmission according to the third embodiment, first brake B, second brake C and third clutch D are disposed intensively on the opposite side of the three planetary gear sets relative to input shaft IN, as shown by the skeleton diagram of FIG. 7. Thereby, the distance between the fixed wall formed with the oil passages and each of the clutch and brakes can be substantially equalized or shortened, so that a routing of oil passages becomes easy with a superior controllability of the respective clutch and brakes. First clutch A and second clutch E can also be disposed to radially overlap with each other. In this case, similarly, first clutch A and second clutch E can be disposed intensively on the input-shaft side (in an area near input shaft IN) of the three planetary gear sets. Also in this case, the distance of the oil passage can be substantially equalized, so that a routing of oil passages becomes easy with the superior controllability.

Moreover, a rotating member passing on an outer peripheral side of the planetary gear sets is composed of only output shaft OUT in a single-layered structure, as shown by the skeleton diagram of FIG. 7. Accordingly, the discharging efficiency of lubricating oil is not worsened so that the durability can be enhanced.

Third Modified Example

Next, a third modified example of the third embodiment according to the present invention will now be explained. Since a basic structure of the third modified example is same as that of the above example explained in the third embodiment, only structural parts of the third modified example which are different from the above example are now explained.

Figure 9:
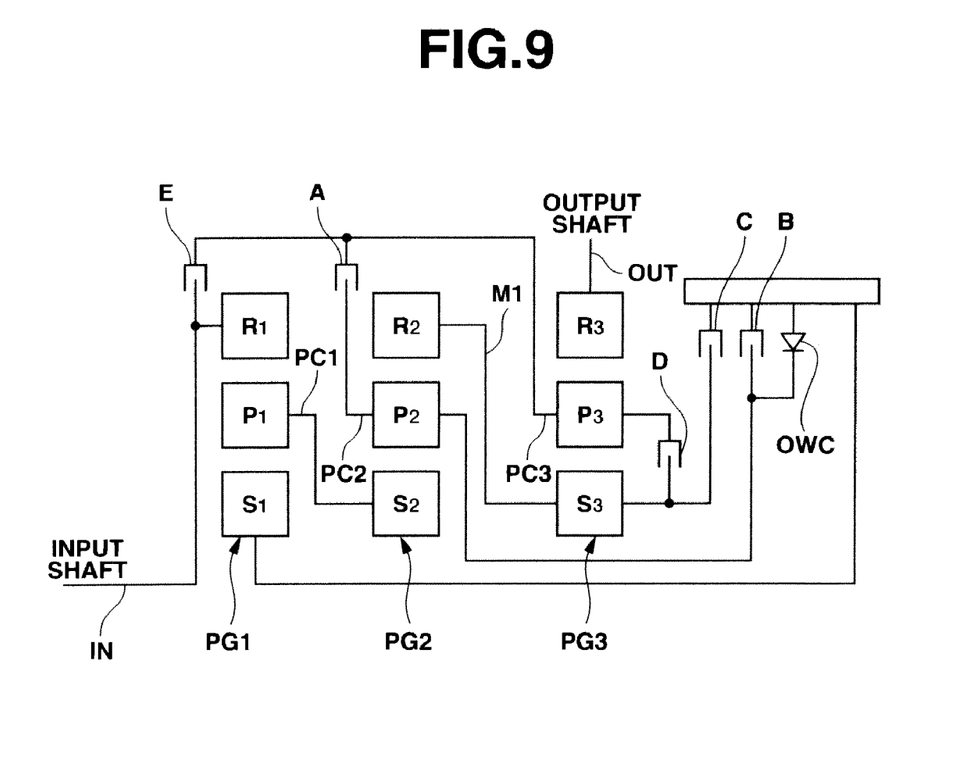
FIG. 9 is a skeleton diagram showing a third modified example of the third embodiment.

FIG. 9 is a skeleton diagram showing a shift mechanism of an automatic transmission of the third modified example. In the third modified example, one-way clutch OWC is provided in parallel with first brake B. In the third embodiment, it is recognized that second carrier PC2 rotates in the positive direction under all the speed-ratios, by checking the rotational speeds (each number of revolutions) of second carrier PC2 under all the speed-ratios. Therefore, in the third embodiment, just only by providing one-way clutch OWC in parallel with first brake B; the simplification of control logic can be achieved without greatly increasing the number of components, and the excessive engine-brake feeling can be suppressed during the normal running of vehicle.

This application is based on a prior Japanese Patent Application No. 2007-144323 filed on May 31, 2007. The entire contents of this Japanese Patent Application are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission comprising:
    a first planetary gear set including
        a first sun gear,
        a first pinion engaged with the first sun gear,
        a first carrier supporting the first pinion, and
        a first ring gear engaged with the first pinion;
    a second planetary gear set including
        a second sun gear,
        a second pinion engaged with the second sun gear,
        a second carrier supporting the second pinion, and
        a second ring gear engaged with the second pinion;
    a third planetary gear set including
        a third sun gear whose rotation is constantly in stopped state,
        a third pinion engaged with the third sun gear,
        a third carrier supporting the third pinion, and
        a third ring gear engaged with the third pinion;
    an input shaft constantly connected with the second sun gear;
    an output shaft constantly connected with the first ring gear; and
    at least five friction elements including
        a first clutch adapted to selectively connect the first carrier with the second carrier,
        a first brake adapted to selectively stop a rotation of the second carrier,
        a second brake adapted to selectively stop a rotation of a rotating member having the first sun gear, the second ring gear, and the third carrier,
        a second clutch adapted to selectively connect the first carrier with the second sun gear, and
        a third clutch adapted to selectively connect the third ring gear with the first ring gear,
    the automatic transmission being adapted to achieve at least seven forward speed-ratios and one reverse speed-ratio, each of the at least seven forward speed-ratios and one reverse speed-ratio being achieved by engaging two friction elements selected from the first to third clutches and the first and second brakes.

2. The automatic transmission as claimed in claim 1, wherein
    a first speed-ratio of the seven forward speed-ratios is achieved by engaging the first clutch and the first brake,
    a second speed-ratio of the seven forward speed-ratios is achieved by engaging the first clutch and the second brake,
    a third speed-ratio of the seven forward speed-ratios is achieved by engaging the first clutch and the third clutch,
    a fourth speed-ratio of the seven forward speed-ratios is achieved by engaging the first clutch and the second clutch,
    a fifth speed-ratio of the seven forward speed-ratios is achieved by engaging the second clutch and the third clutch,
    a sixth speed-ratio of the seven forward speed-ratios is achieved by engaging the second brake and the second clutch,
    a seventh speed-ratio of the seven forward speed-ratios is achieved by engaging the first brake and the second clutch, and
    the reverse speed-ratio is achieved by engaging the first brake and the third clutch.

3. The automatic transmission as claimed in claim 1, wherein
    each of all the shifts between adjacent two speed-ratios among the at least seven forward speed-ratios is performed by releasing one friction element of the at least five friction elements and by engaging the other one friction element of the at least five friction elements.

* * * * *